United States Patent [19]

Komine

[11] Patent Number: 4,919,536
[45] Date of Patent: Apr. 24, 1990

[54] SYSTEM FOR MEASURING VELOCITY FIELD OF FLUID FLOW UTILIZING A LASER-DOPPLER SPECTRAL IMAGE CONVERTER

[75] Inventor: Hiroshi Komine, Torrance, Calif.

[73] Assignee: Northrop Corporation, Hawthorne, Calif.

[21] Appl. No.: 203,360

[22] Filed: Jun. 6, 1988

Related U.S. Application Data

[63] Continuation-in-part of Ser. No. 828,806, now abandoned.

[51] Int. Cl.$^5$ .................... G01P 3/36; G01N 21/00
[52] U.S. Cl. .................... 356/28.5; 356/28; 356/337; 356/338; 356/339; 356/432
[58] Field of Search .............. 250/338 GA; 356/337, 356/338, 339, 432, 433, 437, 28, 28.5

[56] References Cited

U.S. PATENT DOCUMENTS

| | | | |
|---|---|---|---|
| 3,825,346 | 7/1974 | Rizzo | 356/338 |
| 4,206,999 | 6/1980 | Keller | 356/338 |
| 4,375,334 | 3/1983 | Gerber | 356/339 |

OTHER PUBLICATIONS

W. T. Mayo et al, App. Opt., vol. 10, No. 9, 9-1971, p. 2119.
B. Hiller et al, Opt. Lett., vol. 8, No. 9, 9-1983, p. 474.

*Primary Examiner*—Stephen C. Buczinski
*Attorney, Agent, or Firm*—Terry J. Anderson; Robert B. Block

[57] ABSTRACT

A flow field seeded with small particles is illuminated by collimated, monochromatic laser light sheet 16. Doppler shifted scattering from particle motion is imaged by an optical system 22. An optical frequency-to-intensity converter 24 is located at the image plane such that the transmitted image contains a simultaneous two-dimensional measurement of flow velocity along a direction determined by a laser beam and observer (converter) direction. These images can be observed directly or through a TV-2-D array camera and monitor or processed through a computer system 28.

32 Claims, 5 Drawing Sheets

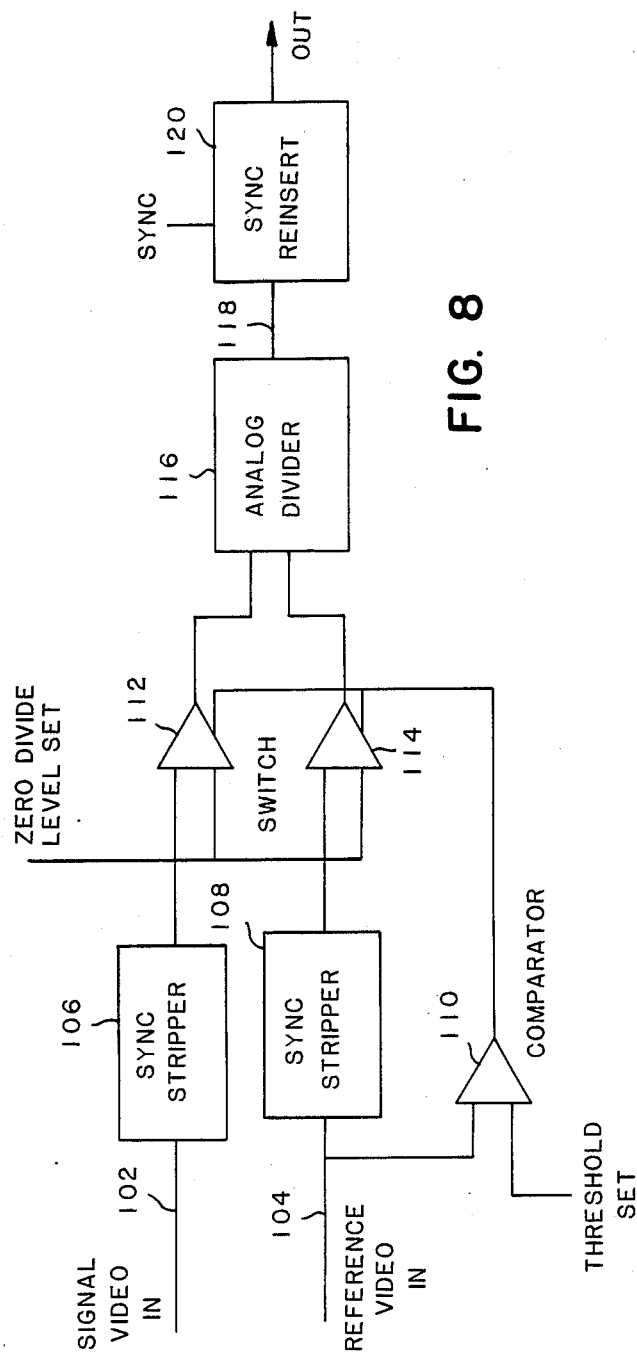

SYSTEM FOR MEASURING VELOCITY FIELD OF FLUID FLOW UTILIZING A LASER-DOPPLER SPECTRAL IMAGE CONVERTER

This application is a continuation-in-part of application Ser. No. 828,806, now abandoned.

FIELD OF THE INVENTION

The present invention relates to an improved technique of velocity field measurement of fluid flow and more particularly to such measurements taken of gaseous and liquid flow using laser-Doppler spectral image analysis.

Description of the Prior Art

Existing methods of measuring flow velocity fields in wind tunnels where the flow interacts with a test object, measuring the exhaust flow of a jet engine, or measuring the aerodynamics of a jet plane at various angles of attack, are mainly based on single-point laser Doppler velocity (LDV) which requires several spatial scanning cycles to obtain data over a two or three dimensional region. The basic principles of this technique are discussed in a book by L. E. Drain, "The Laser Doppler Technique" (Wiley, Chichester, 1080). Such scanning cycles are time consuming to carry out, and the technique is limited to steady flows.

For unsteady, turbulent flows several methods of multi-point velocimetry have been tried in order to overcome the limitations of the conventional LDV technique. One method, disclosed in an article by W. T. Mayo et al, "New Doppler Holographic Technique for Fluid Velocity Visualization and Measurement", App. Opt. 10, 2119 (1971), utilizes an optical heterodyne receiver to image Doppler shifts due to particles in a flow illuminated by a monochromatic laser beam. Light scattering from a sampled region is imaged onto a plane, and a reference laser beam is used to create a hologram representing a two-dimensional contour of equal velocity component (isotach). Different isotach measurement may be obtained by changing the reference laser frequency. A disadvantage of this approach is that it requires long exposure times to obtain high velocity resolution for a given isotach measurement. Such exposure times are undesirable since holographic recording efficiency is reduced, and mechanical vibration of the optical apparatus can make the measurement impractical.

Another method of imaging Doppler shifted scattering has been described in an article by Belousov, et al, "Visualization of a Flow-Velocity Field", Opt-Spectroc (USSR) 52, 524 (1982). In this disclosure, an optical processor with coherent feedback is used to convert frequency shifts into intensity variations using, in one implementation, a semiconfocal interferometer as a wide-band spatial frequency filter and a resonant spectral frequency filter. In this type of optical feedback processor, the geometry and optical aberrations are directly coupled to the spectral resolution and dynamic range so that alignment of the interferometer becomes a critical factor.

An alternative to the light scattering approaches is disclosed in an article by Hiller et al, "Laser-Induced Fluorescence Techniques for Velocity Field Measurements in Subsonic Gas Flows", Opt. Lett. 8, 474 (1983) wherein laser induced fluorescence from moving molecules seeded in a flow is used to quantitatively visualize the velocity field. This technique uses a monochromatic laser beam in a form of a light sheet to illuminate a region of flow containing molecular iodine vapor. The laser frequency is tuned to the wing of one of the iodine absorption lines near its linearslope portion. The motion of the molecules along the beam path results in greater or lesser absorption depending on the magnitude and direction of motion relative to the free-stream value. The absorbed light is re-emitted as fluorescence at a longer wavelength which can be observed through an appropriate color filter. Thus, fluorescence intensity is a measure of a velocity component. This technique is limited to environments in which iodine seeding is practicable.

There is a need, therefore, to provide a system for measuring and visualizing a flow velocity field which is insensitive to mechanical vibration and wherein the spectral resolution and dynamic range of the measurement is not dependent on the system geometry or affected by optical aberrations. A further improvement to the prior art techniques described would be one in which the flow field itself is not seeded with toxic elements such as iodine, so that velocity measurements can be made within existing large volume wind tunnels.

OBJECTS OF THE INVENTION

It is a general object of the invention to provide a real time Doppler based fluid velocity measuring system.

It is a further general object to provide a Doppler velocity measuring system of the above character which uses a two-dimensional optical absorption filter which is positioned external to the fluid flow medium for analyzing the velocity field components of the said flow using the Doppler-shift of the laser light image scattered off of moving particles in the flow; and which uses atomic or molecular vapor, which need not fluoresce, as working medium for the filter; and which provides real-time, intensity-to-velocity image conversion and calibration using image intensity normalization with a reference image.

It is a further object of the invention to provide a velocity field measuring system of the above character which creates a pseudocolor display from velocity intensity values wherein the color varies between hues according to the intensity, for easier visualization.

It is a further object of the invention to provide a pseudocolor display of the above character which operates in real time so that the display update follows the received image changes as they occur.

It is a further object of the invention to provide a velocity field measuring system in which the illuminating source is pulsed so that an instantaneous value of the velocity field is captured within each display frame, in real time, during each frame, and unsteady flows can be examined minutely over a sequence of such frames.

SUMMARY OF THE INVENTION

The present invention is based on laser-Doppler spectral image analysis for both the measurement and quantitative visualization of the flow velocity field.

A flow field seeded with small particles is illuminated by a collimated, monochromatic sheet of laser light. Doppler shifted scattering from particle motion (assumed to represent the flow velocity) is imaged by an optical system. An optical frequency-to-intensity converter (i.e. spectral image analyzer) is located at the image plane such that the transmitted image contains a simultaneous two-dimensional measurement of flow velocity component along a direction determined by the laser beam and observer directions. For example, Doppler frequency shifts to a higher or lower value may be represented by a higher or lower transmission through the converter. Under uniform illumination and scattering the regions of equal transmitted intensity correspond to isotachs. These images can be observed directly or through a TV/2-D array camera and monitor or processed through a computer system.

A novel spectral image analyzer accomplishes the frequency-to-intensity conversion. The analyzer is a thin optical filter cell containing narrow linewidth absorbers having an absorption line with a linear portion. The laser frequency is tuned to one side of the absorption line profile near the linear portion. Transmission of the filter for the free-stream case (no object in flow path) may be set nominally at the 50% operating point of the filter. Doppler-shifted scattering into frequencies higher than the operating point are further detuned from the absorption line, thereby yielding higher transmission. The downshifted scattering is then closer to the absorption peak which results in less transmission. Since the conversion process is dependent only on the absorption spectrum and not on fine angular or spatial properties of the apparatus, the spectral image analyzer has a wide field-of-view and is insensitive to mechanical vibrations. This is in contrast to the prior art methods of Mayo et al and Belousov et al described hereinabove. The present invention utilizes narrow linewidth absorbers housed in a detection system external to the flow field. Hence, the flow field itself does not have to be seeded with absorber species, such as iodine, as in the method of Hiller et al. This makes the present method amenable to existing large volume wind tunnels.

The present invention can be extended to simultaneously measure two or three vector components of a two-dimensional region with two or three spectral image analyzers situated at non-coplanar positions relative to the light sheet. Images recorded under such arrangements can be processed by a computer which is programmed to generate a vector field. Extension of the technique to three dimensional field measurement can be accomplished by simply moving the laser light sheet to a new position time sequentially. Computer image processing can also be used to treat cases of non-uniform intensity illumination and/or scattering by obtaining an image without the spectral image analyzer and normalizing the analyzed image.

For a better understanding of the invention, as well as further features and objects thereof, reference is made to the following description which is to be read in conjunction with the accompanying drawing wherein:

BRIEF DESCRIPTION OF THE DRAWINGS

FIG. 8 is a schematic block diagram of an analog circuit for operating the apparatus of FIG. 7.

DETAILED DESCRIPTION OF THE INVENTION

Figure 1:
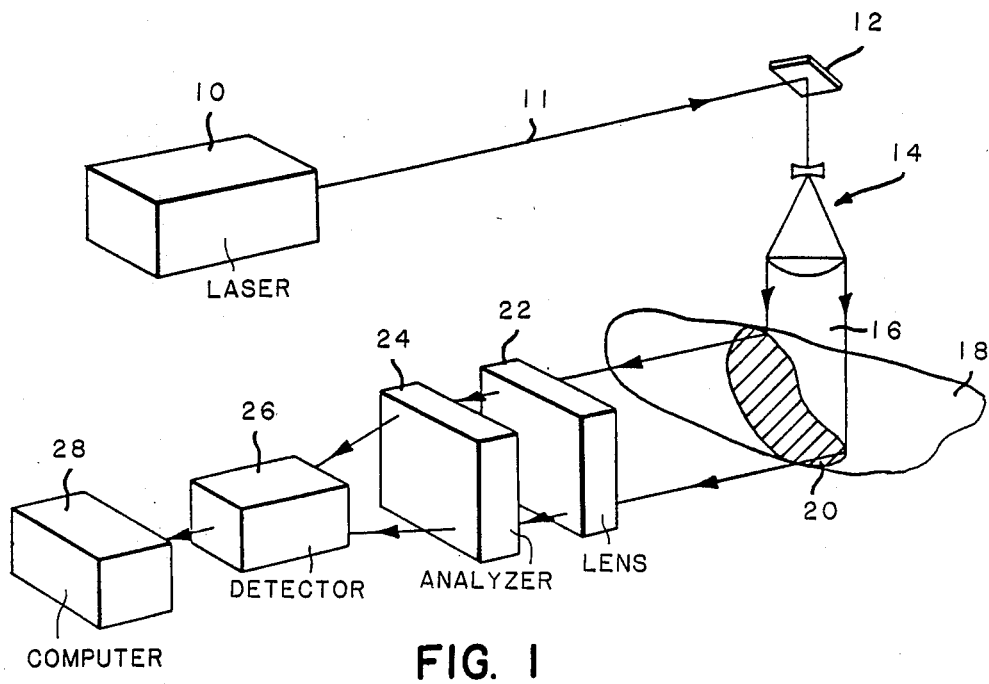
FIG. 1 is a schematic of the two-dimensional flow field velocimeter system of the present invention.

A schematic diagram of a two-dimensional flow field velocimeter system in accordance with the teachings of the present invention is shown in FIG. 1. The light sheet source for the system consists of a monochromatic, frequency-stabilized laser 10, such as an argon or Nd:YAG laser, which generates laser beam 11, a beam steering mirror or delivery device 12, such as fiber optic cable, and beam expander/collimator optics 14. The resulting beam 16 from optics 14 has a form of a thin sheet with constant thickness and width. The light sheet illuminates a cross-section of a flow field 18 in one or more planes, of which, one plane 20, is shown. Although not shown, the flow field is supported in a wind tunnel where the type of measurement described is typically conducted. Several planes can also be illuminated simultaneously by employing partially reflective beam splitters and additional beam steering optics. The laser light is pulsed, thus illuminating the flow field for a brief duration to effectively "sample" the particle motion. This permits a two-dimensional, time-resolved velocity measurement particularly suited for unsteady flows which is not possible if the flow field had been illuminated with constant laser light.

Figure 2:
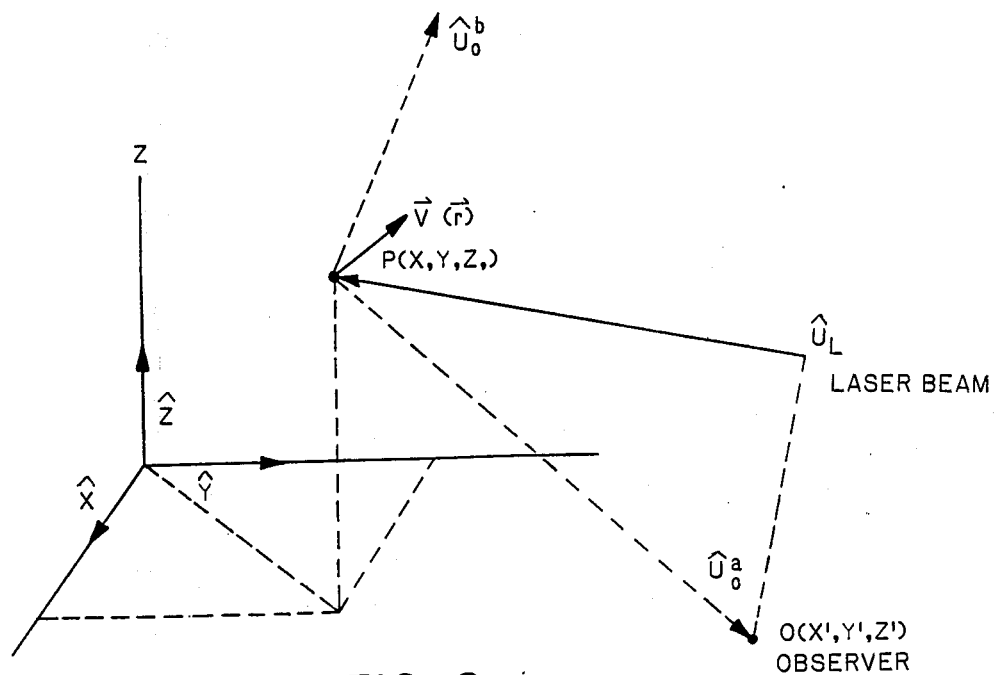
FIG. 2 is a graph illustrating the calculation of the Doppler shifted spectrum of scattered laser radiation.

The flow field is seeded with smoke or fog particles which are carried by its motion through illuminated plane 20 where the particles scatter the laser light adding a Doppler component due to their own motion in the stream. It should be noted that the present invention can also be used to measure liquid flows by seeding with small, lightweight styrene spheres or other solid particles. Relative motion of the seed particles with respect to the laser beam direction $U_L$ and the observer direction $U_o$ (see FIG. 2) yields a Doppler shifted spectrum of scattered laser radiation. The shift $\Delta \nu$ is related to the velocity vector $\vec{v}$ at location $\vec{r}$ according to the known formula:

$$\Delta \nu \, (\vec{r}) = \vec{v}(r) \cdot (\hat{U}_L - \hat{U}_o) \frac{\nu}{c}$$

where $\nu$ is the laser frequency and c is the speed of light. Thus, for every point in the illuminated plane 20 the scattered light yields a frequency shift $\Delta \nu$ relative to the laser frequency. Referring to FIG. 2 for a more detailed explanation of the scattering effect, the flow at a point P is represented by a vector having three components. When Doppler shift is measured, it is along the line of sight of the observer. In other words, the Doppler shift that is observed (in the case of the present invention the position of the spectral image analyzer 24) at a point in the flow field plane that is being interrogated (i.e., P(x,y,z)) by the laser beam, is the flow component along the line of sight. At coordinate points X,Y,Z, the flow has a vector in three dimensions and is represented by $\vec{V}(r)$. In the figure, the observer O(x',y',z') is arbitrarily positioned at location "a", as shown and the line of sight connecting the observer position and the position of the flow interrogated by the laser beam is represented by unit vector $U_o{}^a$ (a unit length of one pointing in the direction of the observer). The laser light is represented by a unit vector $\hat{U}_L$ pointing in the direction of the interrogated flow point. The physical mechanism is that light shines on the moving particle so that scattered light from the region of space seen by the observer will have a frequency shift characteristic of the Doppler shift in the direction of the observer. In a simplified example, it is assumed that the vector $\hat{U}_L$ is going exactly anti-parallel to $\hat{U}_o$ (observer is looking at back scattered light). Then the Doppler shift is arrived at, as follows:

$$\hat{U}_L - \hat{U}_o = 2 \times \hat{U}_o (\text{or } \hat{U}_L);$$

assuming that the velocity field $\vec{V}(\vec{r}) = V_z \hat{Z}$ $$\Delta \nu = \frac{\nu}{c} \vec{V}(\vec{r}) \cdot 2\hat{U}_o = 2V_z \frac{\nu}{c}$$

As is well known, the vector scalar product produces a certain vector component projection of the field depending upon where the observer and laser beam are positioned. In the simple case provided above, the Z component of the velocity field was obtained. If a detector (observer) is positioned at a location represented by vector $\hat{U}_o^b$ and the laser beam frequency is fixed, then this vector would have a vector difference between it and the laser beam which is different than what would result from a detector located at a ($\hat{U}_o^a$). When the scaler product is taken the flow vector is projected onto a different axis. Thus, by choosing the proper location of the detectors, the scaler product of the flow vector into the three mutually orthogonal unit vectors provides all information necessary about the Doppler shift at the point being interrogated (note that either one, two or three detectors can be used depending upon the accuracy of the flow information desired).

An optical system 22, such as a camera lens, for collecting the scattered light produces an image at whose frequency spectrum contains the two-dimensional velocity field information. This image is transmitted through a spectral image analyzer 24 (described in more detail hereinafter) in which the transmission value is a unique function of the scattered radiation frequency. In the present invention, analyzer 24 includes a thin sheet of narrowband frequency sensitive absorbers whose absorption wing provides the frequency-to-transmitted intensity conversion process. The laser Doppler scattering image is thus transformed into an intensity-weighted image having intensity variations proportional to the velocities which image can be observed directly or through a suitable detector device 26, such as a TV camera or a two-dimensional photodetector array with a display monitor.

The observed image can be translated into a quantitative velocity component image by a programmable processing device, or computer, 28 for processing the image information received from device 26. This information processing involves assignment of a velocity value as a function of intensity whose functional relationship is known from a prior calibration procedure. This assignment is executed for each spatially resolved image spot. The processed image can then be displayed as two-dimensional contours of equal velocity component (isotachs). By repeating the above procedure for images taken at different cross-sectional positions in the flow field, three-dimensional isotachs can be obtained. Extension of this procedure to two or three-component velocity field measurements can be accomplished by employing two or three spectral image analyzers, respectively, at suitable locations such that three mutually orthogonal velocity components can be obtained from the Doppler spectrum as set forth hereinabove, computer 28 being programmed to provide the appropriate vector field.

The intensity-weighted spectral image has been assumed to be obtained under uniform laser intensity illumination and particle scattering. This assumption may not always hold if the laser light sheet has local non-uniform intensities or the seed particle density distribution is non-uniform due to the flow dynamics. Under these conditions the scattered intensity variations must be taken into account in the intensity-weighted spectral image analysis. This may be achieved in two ways. A split beam method uses a reference image detector without the spectral image analyzer 24. In this configuration a 50% beam splitter divides the observed image from optics 22 into two paths: one for the spectral image analyzer 24 and the other for a reference image detector identical to detector 26. After the image field is aligned between the two detectors, the intensity of the analyzed image is normalized to the intensity of the corresponding point in the reference image in processing device 28 (intensity values after transmission through analyzer 24 are divided on a spatial point-by-point basis by the output of the reference image detector), as hereinafter shown in FIGS. 7 and 8.

An alternate normalization method uses two laser pulses separated by a period longer than the frame interval of the detector 26. The pulses may be generated from a tunable laser or two independently-tuned lasers. The first laser pulse has a frequency far removed from the absorption wing such that no attenuation occurs for any Doppler shifted radiation. Thus the image transmitted through the spectral analyzer effectively yields a reference image without the need for a second detector. The second laser pulse has the proper illumination frequency for acquiring the Doppler spectral image. Image intensity normalization with these consecutive images in processing device 28 yields the proper velocity information. A basic requirement for this technique is that the time interval between the pulses be less than the transit time of particles across the thickness of the light sheet beam 16 such that the accurate normalization measurements of non-steady velocity fields can be made. In practice the light sheet is about 1mm thick, and subsonic speeds lead to transit times as short as a few microseconds. If the successive image frame interval is longer than the transit time, this method would only be accurate for relatively quasi-steady flows in which velocity fields do not change significantly between frame intervals.

The design requirements of the spectral image analyzer 24 include dynamic range, frequency resolution, transmission resolution, spatial resolution and uniformity. These requirements are described hereinbelow in terms of the physics of the absorber medium consisting of atomic vapor or molecular gases.

Figure 3:
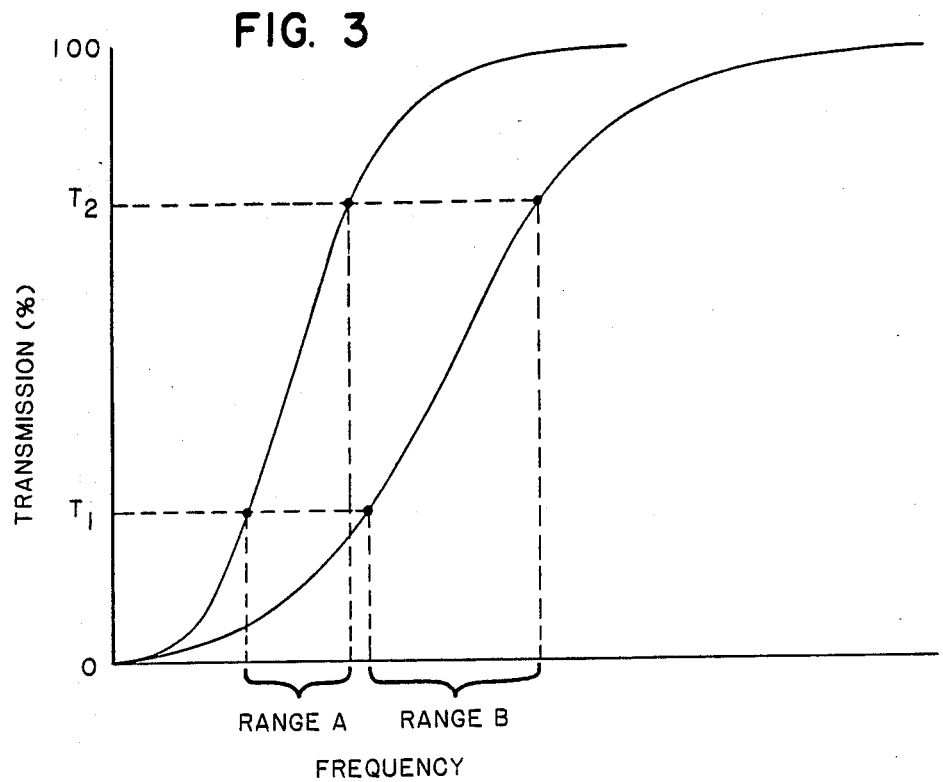
FIG. 3 is a graph illustrating the relationship between the Doppler shift and the corresponding transmission value of a typical absorption medium.

The dynamic range requirement is derived from the flow velocities of interest in a given measurement. For subsonic flows in air, the Doppler shift at a laser wavelength of 500nm would be at most $0.02 cm^{-1}$ (600 MHz) in either direction. Proportionately larger or smaller shifts would result with shorter or longer laser wavelengths, respectively. This range of Doppler shift requires an absorption wing which has a quasi-linear slope over a frequency interval of about 1.2 GHz. FIG. 3 shows graphically the dynamic range requirement, and the relationship between the Dopler shift and the corresponding transmission value of a typical absorption medium. Note that a Doppler frequency up-shift (or down-shift) can be represented by an increasing or decreasing transmission value depending on the side of the absorption wing. In general, the quasi-linear slope of an absorption wing varies linearly with its linewidth of the absorption medium (linewidth is defined as the frequency bandwidth between the midpoint of the maximum and minimum values of the absorber medium extinction function). Thus mechanisms that determine the linewidth, such as collisional and Doppler broadening, can be exploited to vary the dynamic range. For example, in an atomic vapor, the temperature and buffer gas pressure may be used to control the linewidth and the resultant wing slope of the curve shown in FIG. 3. In essence, range A and B correspond to a given transmission range for different absorption widths.

Figure 4:
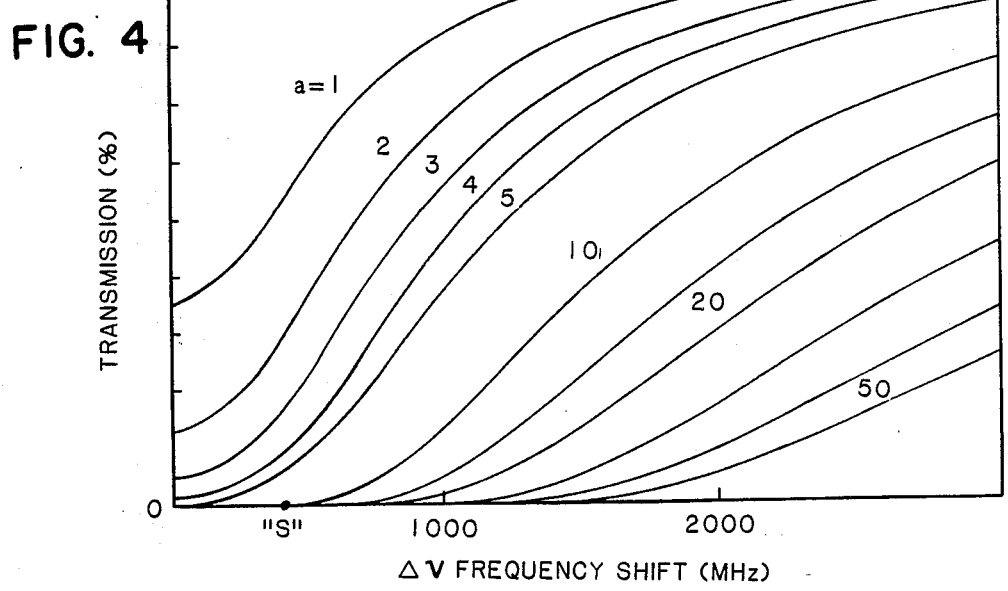
FIG. 4 is a graph of the Gaussian line shape transmission profile.
Figure 5:
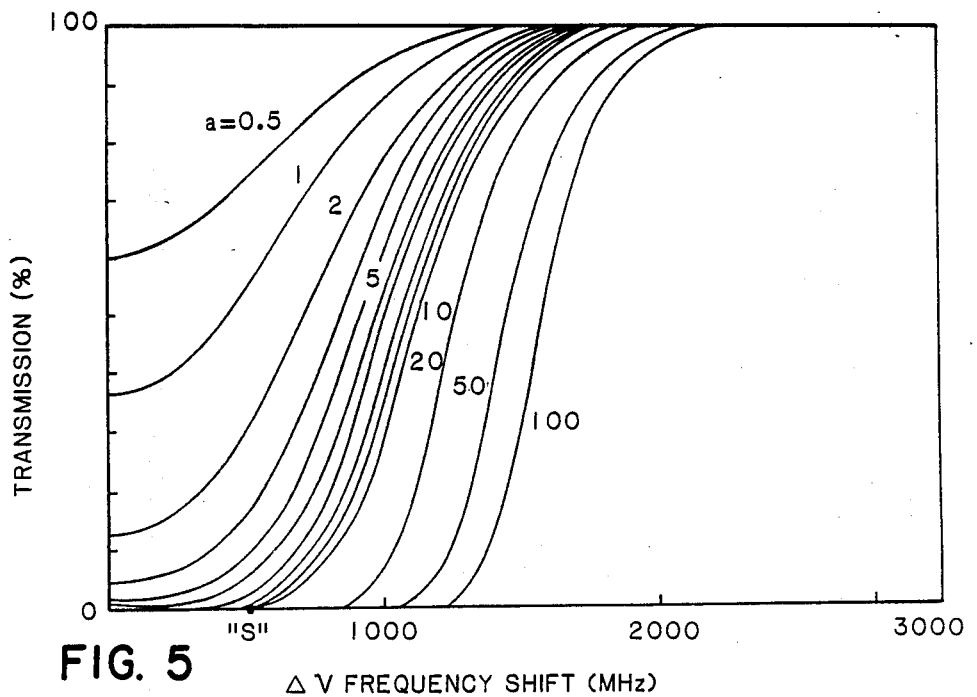
FIG. 5 is a graph of the Lorentzian line shape transmission profile.

The extinction value at the line peak can also be used to vary the slope. In this case, if the line-center transmission is less than $e^{-10}$, the transmission profile is highly nonlinear in frequency as shown in FIGS. 4 and 5, for the cases of Gaussian and Lorentzian line shapes, respectively (the analyzer transmission v. Doppler frequency shift for a Gaussian absorption line as a function of absorption coefficient, $\alpha$, is given by:

$$T = \exp(-\alpha \cdot \exp(-2(\Delta\nu/B)^2)$$

with B=1000 MHz; the analyzer transmission v. Doppler frequency shift for a Lorentzian absorption line as a function of absorption coefficient, $\alpha$, is given by:

$$T(\nu) = \exp\left(-\alpha \cdot \frac{1}{1 + (2\nu\Delta/B)^2}\right)$$

with B=1000 MHZ.
However, this behavior has the advantage that a sharp cut-off of transmission at a certain laser frequency can be used to attenuate laser scattering from stationary backgrounds such as the model or the wind tunnel walls. For example, this can be accomplished by tuning the laser frequency to the position "S" in FIGS. 4 or 5 if the flow direction is toward the observer (corresponding position on the opposite wing if the flow direction is away from the observer). The Doppler shifted spectrum from the flow particle scattering is chosen to match the linear transmission region. Hence only the light scattering from the moving particles is transmitted through the spectral image analyzer 24. This is a useful feature since extraneous background scattering can obscure the laser-Doppler signal. Typically, the transmission profile of an absorption medium is somewhere between the Gaussian and Lorentzian line shapes illustrated in the figures, the actual profile being designed such that the absorption range occurs near the laser frequency. The pressure of a buffer gas added to the absorption medium and the medium density (which controls $\alpha$) are the parameters which determine the profile.

The frequency resolution of the spectral image analyzer is governed by the laser frequency stability, detector response resolution, and field of view. Commercial continuous-wave (cw) ion (such as argon) and dye lasers can maintain frequency drift of ±10 MHz over a 10 minute period which is adequate for the measurement. This drift translates to less than ±5 m/sec velocity measurement. The detector 26, such as photodiode arrays have a linear intensity response over a 100 to 1 dynamic range such that ±3 m/sec velocity resolution is feasible.

The field of view requirement arises from the dependence of transmission on absorption path length which varies with the angle of incidence. For a variation of ±1% on the transmission value operating near the T=50% point, the allowable angular field is about ±10 degrees from normal.

The spatial resolution of the spectral image analyzer is basically determined by the optical quality of the imaging system and the detector element resolution and number. The spatial uniformity of the absorber optical thickness is important, and the number density of the absorber species should be kept constant to within a range consistent with the accuracy of the transmission measurement.

Typical of the materials usable for absorption medium include atomic species such as alkali metal vapor and molecular gases such as diatomic iodine and interhalogen molecules. The alkali atoms (atomic species) provide a number of resonance lines in the visible region. For example, cesium (459 nm), rubidium (420 nm), potassium (404 nm), sodium (589 nm), and lithium (671 nm) can be matched by tunable narrow bandwidth lasers. These resonance lines have large absorption cross sections and require only modest vapor pressure to achieve the desired absorption characteristics. Molecular gases such as molecular iodine and bromine also provide many lines in the visible spectrum, some of which coincide with the emission lines of an argon ion laser and the frequency-doubled output of a Nd:YAG laser. The analysis given above shows that an analyzer based on iodine is capable of measuring velocity components of up to ±150 m/sec with resolutions of about 2m/sec. For slower motion, the analyzer may be operated over a range of ±40 m/sec by using a back scattering geometry and large extinction values.

Spectral image analyzer 24 basically comprises a cell 25 containing the absorber species (absorption medium) and an enclosure which maintains a certain temperature and pressure for the desired operating conditions. As noted hereinabove, the transmission profile is determined by the medium density which is dependent on the medium vapor pressure. Vapor pressure in turn is dependent on the temperature of the medium. The transmission profile is also affected by the pressure of buffer gases added to the absorption medium. Cesium vapor and molecular iodine typically are operated in the range from about 500 C to about 100 C whereas potassium vapor is operated in the range from about 50 C to about 300 C. The buffer gases (i.e., the inert gases such as helium, argon or nitrogen) are mixed with the absorption medium to maintain a mixture pressure which is generally less than 100 Torr.

Figure 6:
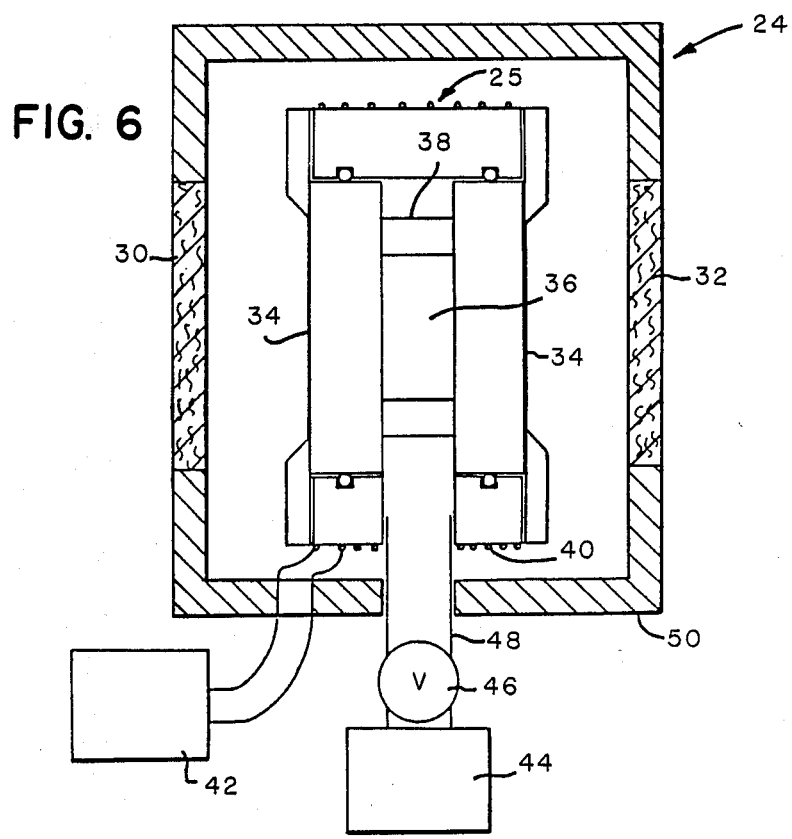
FIG. 6 is a side view, partially in cross-section, and partly schematic, of the novel spectral image analyzer utilized in the system of the present invention.

FIG. 6 shows a schematic side view of the analyzer 24. The entrance of the analyzer 24 is a bandpass filter window 30 which blocks all but a narrow band spectrum around the laser-Doppler radiation. This may be an interference filter with a 10 nm pass band. The same filter may be used as the exit window 32 which blocks any unwanted fluorescence emission from the absorber species. The absorber cell windows 34 contain the atomic or molecular species 36 selected for the application. The windows are separated by a fixed spacer 38 in order to maintain a constant medium thickness over the analyzer aperture. The cell assembly 25 is held in a sealed oven with heater elements 40 which are connected to an external power supply (not shown) and a temperature controller device 42 which allows the temperature of the atomic or molecular species to be varied. The cell pressure may be adjusted by buffer gas 44 introduced via valve 46, pipe 48 and an opening in spacer 38 (it is not always necessary to use a buffer gas; temperature control of the absorption medium being sufficient in certain situations to provide the desired transmission profile). The entire cell assembly 25 is housed in an enclosure 50 which insulates the cell and holds the input and output filters 30 and 32. Filters 30 and 32 may be replaced by transparent windows for viewing the image with background lighting.

The discussions so far assumed that both the laser illumination and he scatterer density in the flow be uniform. This will usually not be the case, and it must be taken into account in the image analysis since the demodulator output is proportional to both of these quantities. The nonuniformities can be taken into account by normalizing the output image of the Doppler image analyzer to an image obtained without the analyzer. In practice this can be accomplished in several ways. One method is to split the received scattered radiation into two parts, one (the velocity filtered one) of which is used as discussed above while the other one (reference) is imaged onto a second detector, without going through the analyzer. An alternate method uses two laser pulses at different wavelengths. The wavelength of the first pulse is chosen such that no interaction occurs with the absorber, while the wavelength of the second pulse is selected to fall within the wing of an absorption line. The first image can then be used to normalize the second one.

The processing of the velocity-filtered and reference video images of the flow field can be accomplished with a video frame grabber circuit board (Imaging Technology PC-Vision) installed in a personal computer (PC-AT) along with appropriate management and processing software.

Because a point-by-point image division is done as a consequence of the normalization procedure, care is taken to match the two image paths and view angles so that equivalent magnification and image orientation result at the camera focal plane. For a single camera detection system, the degree of equivalence of the reference and analyzed images largely dictates the spatial resolution obtainable from the flow field.

Figure 7:
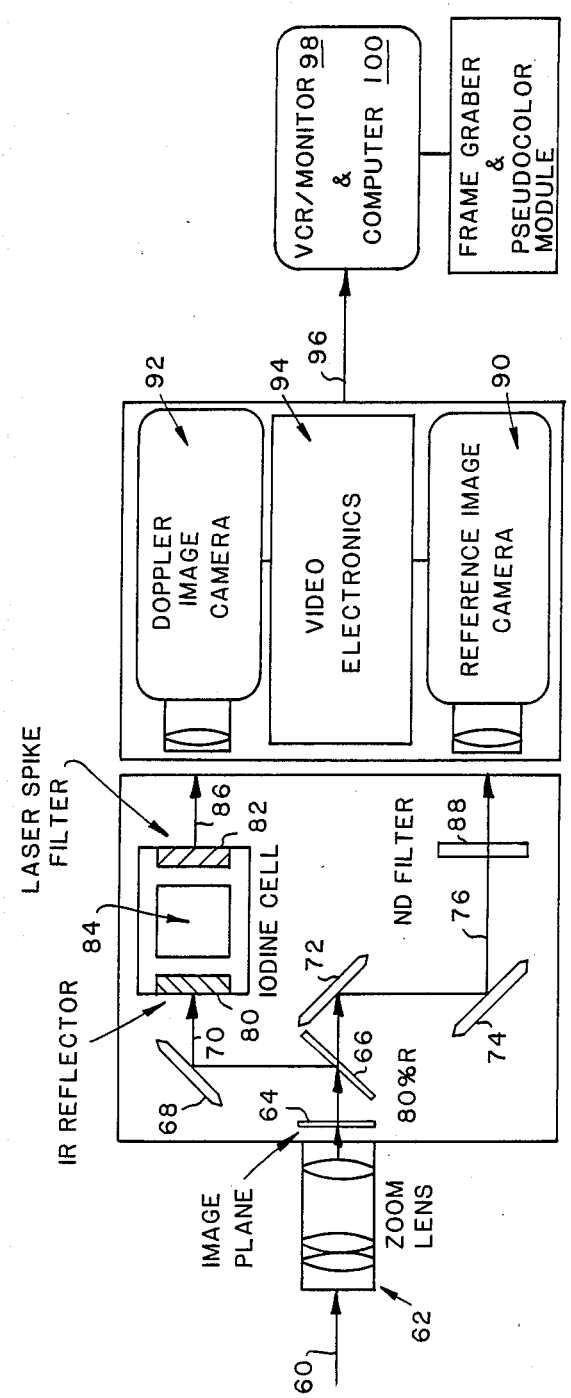
FIG. 7 is a schematic diagram of an apparatus for carrying out the split beam image normalization method of the present invention.

In a two-camera system, spatial resolution is improved by using the full area of each detector. A schematic arrangement is shown in FIG. 7 for a two-camera system which also includes a single zoom lens. The zoom lens forms a magnified image at a plane which is re-imaged by the two cameras via a beam splitter. One camera receives the reference image while the other camera detects the Doppler image through the analyzer cell.

The two camera system also permits flexibility in processing the TV video signal. Since the Doppler and reference images can be read out synchronously, both digital and analog signal processing methods are available to normalize the image intensity.

The analog method involves a novel intermediate step that utilizes the speed of analog signal division circuits to accomplish the normalization procedure at video rates. The normalized signal is then displayed via the computer on a monitor in real time as well as digitized by a single frame grabber for off-line processing. The details of the analog method in a two camera system will now be more fully described.

Referring now to FIGS. 7 and 8, there is shown a split beam image normalization apparatus constructed in accordance with the present invention in which the image output 60 from the illuminated plane 20 is received by a zoom lens 62 and focused into an image of variable enlargement at the image plane 64. A large amount (80%) of the image is reflected at a partially reflecting and redirecting mirror 68 mirror 66 into a first beam 70 for analysis, while a smaller amount (20%) of the image passes through mirror 66 and is redirected by mirrors 72, 74 to form a reference beam 76. Beam 70 is passed through analyzer 78 which is of the same general construction as filter 24 (FIG. 6). The analyzer 78 is provided with an entrance window 80 which blocks IR to eliminate unwanted heating and an exit window 82 which serves as a laser spike filter.

The analyzer contains a cell 84 filled with an absorptive media such as iodine, as previously disclosed, so that the emergent beam at 86 contains spatial intensity information directly related to the velocity strength of the gas at the flow plane 20. Since the beam 86 has experienced considerable absorption, it is necessary to balance the reference beam 76 by neutral density filter 88 in order to balance the relative levels between the reference beam 76 and the filtered beam 86. These beams are received by a reference video camera 90 and Doppler image camera 92, respectively, and the resultant signals compared in analog video electronic circuits 94 (in real time, as will be described), the normalized output of which, at 96, is input to video recorder/monitor 98 and computer 100.

FIG. 8 shows a block diagram of the analog video conversion circuits 94 which includes inputs 102, 104 for Doppler video and reference video, sync strippers 106, 108, and a threshold level set for each channel using comparator op amps 110 and zero divide level set operated into switching op amps 112, 114. The signal output from op amps 112 is divided by the reference signal output from op amp 114 in an analog divider 116 to obtain the final normalized signal at 118 with which a sync signal is reinserted by a sync adder 120. The reference beam is necessary to normalize for non-uniformity of seed density and also variations in laser illumination intensity in the flow so that these factors do not change the intensity variations resulting from image analysis.

While the above apparatus uses two cameras and various electronics to accomplish these purposes, a single camera system could also be employed in which both images are focussed into separate guadrants of a color TV camera for digital processing.

The resultant normalized image is a black and white with an intensity corresponding to the strength of the seed velocity at each image point in the image. It is much easier to visualize if this image were colored, so that the color varied across the spectrum as a function of the strength of seed velocity at each image point means are provided for correcting the image for such colorization, called pseudocolor and includes a frame grabber available from Imaging Technology Incorporated of Woburn, MA. under the trademark PC-Vision with Pseudocolor Module (PPC). For a description of the frame grabber circuit board and PPC module, reference is made to the PC-VISION, Frame Grabber Manual, Copyright 1985, which is incorporated by reference herein, in its entirety. (An information copy is provided as Attachment A.) Programming for the frame grabber is set so that a plurality of saturated color bands are assigned across the velocity spectrum for ease of normalization. Exemplar programming is set forth in Appendix A. As shown, procedure setFalseColor assignes the color range of hue: red, orange, yellow, green, blue, violet, white across eleven (11) bands, for ease of visualization. Note that main program (p.16) calls LookUpTables (p.14) which calls LUTfuction (p.14) which calls setFalseColor (p.8. The program is in Turbo Pascal for fast, real-time execution. The resultant colorized display is illustrated in Appendix B.

An additional practice of this invention utilizes a pulsed visible laser with narrow spectral bandwidth and tunable wavelength that match a number of absorption lines in the filter medium. For example, certain implementations of single-frequency lasers based on Nd:YAG with second harmonic conversion and titanium-doped sapphire crystals provide illumination sources that match molecular iodine and bromine absorption lines. These lasers emit pulses with duration on the order of one microsecond which is sufficiently short to acquire near-instantaneous velocity image measurements in unsteady flows with a spatial resolution of approximately 1 millimeter. Thus, the pulsed laser illumination is an improvement over the continuously illuminating laser sources which yields time-averaged measurements. For a description of such laser sources, refer to T. J. Kane et al 62-dB Gain Multiple-Pass Slab Geometry Nd: YAG Amplifier Optics Letters, Vol. II, No. 4, pages 216-218, April 1986 incorporated herein by reference in its entirety. (An information copy is provided as Attachment B.) It is readily apparent that the video reference sync signal can be used to trigger the pulsed laser with the addition of a short delay to put the output pulse timing in the middle of the time span of the frame.

The pulse length which results is short, from about a value less than $10^{-6}$ seconds and can be made as low as a few hundred nanoseconds so that a snap shot is taken of the flow field. In this snap shot the particles haven't moved very much so that essentially instantaneous look at the flow is obtained, as opposed to CW laser illumination (Argon ion laser) which integrates all scattered events over one frame, i.e. about 30 milliseconds so that fast events tend to be washed out. Preferably, in pulsed operation, the pulse rate is set to one pulse per frame and in sync with the video sync rate frame which it should lag slightly. By using pulsed operation it is possible to look in detail at unsteady flow effects.

Thus, the use of the invention, either in component form or as a system with associated data processing and recording instrumentation, extends to various velocity measurements: air flow around objects in a windtunnel, such as aircraft wings and body; jet engine intake and exhaust flow pattern, engine combustion diagnostics; propeller and rotor flow fields on helicopters; pipe flow analysis; and wind flow studies near man-made and natural structures.

The invention also includes supersonic and hypersonic velocimetry by using small, uniformly sized seed particles with sub-micron dimensions. The small mass of the particles would enable representation of the flow field at velocities greater than the sound velocity.

While the invention has been described with reference to its preferred embodiment, it would be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A system for measuring the velocity of a fluid flow field comprising:
   laser means for generating a monochromatic laser beam;
   a member for supporting said fluid flow field;
   a plurality of particles seeded into the fluid flow field and having the property that they flow along therewith;
   means for directing said laser beam to said fluid flow field in a manner such that a plane of said fluid flow field is illuminated by a light beam of a predetermined thickness and width, the illuminated plane yielding scattering due to those of said particles in the illuminated plane, said scattered light yielding a frequency shift relative to the frequency of said laser beam due to the Doppler effect;
   optical means positioned outside of the region of said fluid flow field for collecting scattered light therefrom and for producing an image whose frequency spectrum contains two-dimensional velocity field information;
   detector means responsive to said image for providing a radiation intensity output which corresponds to said image; and
   an analyzer disposed between the optical means and the detector means and including a frequency-to-intensity converter for converting Doppler frequency shifted frequencies received from the moving particles into intensity variations in said image said analyzer containing a medium including a uniformly dispersed atomic or molecular species the absorption of which varies significantly as a function of frequency over the range of frequency shifts which result from the Doppler effect caused by movement of said particles so that the image intensity in said image is caused to vary by said absorption as a unique function of the velocity of movement of said particles.

2. The system of claim 1 wherein the output of said detector means is incident on a device wherein said radiation intensity image can be observed.

3. The system of claim 2 further including means coupled to said detector means for translating said observed image into a quantitative velocity component, said translating means comprising a computer whereby a velocity value is assigned for each spatially resolved spot in said intensity image as a function of intensity, the processed image being displayed as two-dimensional contours of an equal velocity component.

4. The system of claim 1 wherein said detector means comprises an absorption medium whose radiation transmission characteristics is directly related to the frequency of the light incident thereon.

5. The system of claim 4 wherein said absorption medium comprises gas having an atomic species.

6. The system of claim 5 wherein said atomic species gas comprises alkali metal vapor.

7. The system of claim 6 wherein said alkali metal vapor is selected from the group consisting of cesium, rubidium, potassium, sodium and lithium.

8. The system of claim 5 wherein said absorption medium comprises molecular gas.

9. The system of claim 8 wherein said molecular gas is selected from the group consisting of diatomic iodine, diatomic bromine, and interhalogen molecules.

10. The system of claim 4 wherein a buffer gas is mixed with said absorption medium whereby the absorption curve thereof is controllable.

11. The system of claim 10 wherein said buffer gas is selected from the group consisting of argon, helium and nitrogen.

12. The system of claim 4 wherein the temperature of said absorption medium is controlled whereby the absorption curve of said medium is variable.

13. The system of claim 1 wherein the output image provided by said detector means is normalized.

14. A device for converting incident radiation of varying predetermined frequencies into a radiation image having an intensity varying in manner corresponding to the variation of said incident radiation frequency;
an enclosure having front and rear wall portions;
an absorption medium positioned within said enclosure;
said enclosure containing a first aperture in said front wall to allow said radiation to be incident on said cell and a second aperture in said rear wall of said enclosure to allow observation of said image;
said cell containing a selectively absorbing medium including atomic or molecular species the absorption of which varies significantly as a function of the frequency over the range of said predetermined frequencies so that the image intensity in said image varies as a unique function of the frequency of said incident radiation; and
means for controlling the temperature of said cell whereby the absorption curve of said medium can be varied, said absorption medium transmitting radiation of an intensity which varies with the frequency of the light incident thereon.

15. The device of claim 14 wherein means are provided to mix a buffer gas with said absorption medium whereby the cell pressure can be adjusted thus enabling the absorption curve of said medium to be varied.

16. The device of claim 14 wherein said absorption medium comprises a metal vapor gas.

17. The device of claim 14 wherein said absorption medium comprises a molecular gas.

18. The device of claim 16 wherein the temperature of said metal vapor gas is in a range from about 50° C. to about 300° C.

19. The device of claim 15 wherein the pressure of said buffer gas is less than 100 Torr.

20. The device of claim 19 wherein said buffer gas is selected from the group consisting of helium, argon and nitrogen.

21. A system for measuring the velocity of a fluid flow field with a detector positioned at an image of portions of said field comprising
laser means for illuminating the field with light of a predetermined frequency;
particle means distributed in said field for flowing therewith and for reflecting laser illumination impinging there on a frequencies related to said predetermined frequency by the addition of a component related to the Doppler shift caused by the velocity of movement of said particles;
said laser means delivering an expanded beam to the fluid flow field over a plane passing therethrough and having constant thickness;
an optical imaging system for collecting laser beam energy is scattered from said particles and directed at an angle to the beam and adapted to image said plane on said detector positioned at the image thereof;
a frequency-to-intensity converter disposed in the optical path forming said image for converting Doppler frequency shifted frequencies received from the moving particles into intensity variations in said image; and
said converter containing a selectively absorbing medium, including uniformly dispersed atomic or molecular species exhibiting an absorption which varies significantly as a function of the frequency over the range of frequency shifts which result from the Doppler effect caused by movement of said particles so that the image intensity in said image varies as a unique function of the velocity of movement of said particles.

22. In a device for converting incident radiation of varying over a range of frequencies into a radiation image having a range of intensities corresponding to said incident radiation frequencies;
an enclosure having front and rear wall portions forming a cell; and
an absorption medium positioned within said cell and including uniformly dispersed atomic or molecular species the absorption of which varies significantly as a function of the frequency over the given range of frequencies so that the image intensity in said image plane varies as a unique function of the frequency of the incident radiation.

23. In a Doppler shift measurement apparatus for measuring seed particle velocity in a fluid flow stream by converting incident radiation over a range of frequencies into a radiation image having a range of intensities corresponding to said incident radiation frequencies,
means for illuminating said stream with monochromatic light, said light being scattered by the seed particles and spectrally shifted by the Doppler effect in accordance with the velocity of their movements, the amount of shift being related to the seed particle velocity;
detector means for receiving at least a portion of scattered light;
converter means positioned in the scattered light beam for passing the received light and including an absorption medium containing atomic or molecular species possessing a narrow absorption linewidth with a wing coinciding with the frequency range of the Doppler effect shifts, and
the absorption of said species varying significantly as a function of the frequency over the given range of frequencies so that the image intensity in said image plane varies as a unique function of the frequency of the incident radiation.

24. Doppler shift measurement apparatus for measuring seed particle velocity in a fluid flow stream comprising
means for illuminating said stream with monochromatic light, said light being scattered by the seed particles and spectrally shifted by the Doppler effect in accordance with the velocity of their movements, the amount of shift being related to the seed particle velocity, detector means for receiving at least a portion of scattered light, converter means positioned in the scattered light beam to the detector, said converter means serving for passing the received light and including an absorption medium containing atomic or molecular species possessing a narrow absorption linewidth with a wing coinciding with the frequency range of the Doppler effect shifts, and the absorption of said species varying significantly as a function of the frequency over the given range of frequencies thereby converting incident radiation over a range of frequencies into a radiation image having a range of intensities corresponding to said incident radiation frequencies so that the image intensity in said image plane varies as a unique function of the frequency of the incident radiation.

25. Apparatus as in claim 24 further in which the illuminating means comprises a CW laser source.

26. Apparatus as in claim 24 of which said illuminating means comprises a pulse operable laser source and means for pulsing said source at a predetermined pulse rate.

27. Apparatus as in claim 26 further including computer display means for creating visual image frames based upon the image created at each pulse.

28. Apparatus as in claim 27 further in which the pulse rate is set for once each frame.

29. Apparatus as in claim 26 further in which the pulsed laser source has a pulse length of about one microsecond.

30. Apparatus as in claim 26 further in which said converter means includes molecular iodine vapor at 10-100 Torr and said laser is frequency doubled Nd:YAG matching the iodine absorption line.

31. Apparatus as in claim 27 further including programmed means for assigning false color to each frame including means for said false color varying in here across the spectrum in proportional relation to increase in velocity.

32. Doppler shift measurement method for measuring seed particle velocity in a fluid flow stream comprising illuminating said stream with monochromatic light, said light being scattered by the seed particles and spectrally shifted by the Doppler effect in accordance with the velocity of their movements, the amount of shift being related to the seed particle velocity, receiving at least a portion of scattered light for detection, passing the received light through an absorption medium containing atomic or molecular species possessing a narrow absorption linewidth with a wing coinciding with the frequency range of the Doppler effect shifts, and the absorption of said species varying significantly as a function of the frequency over the given range of frequencies thereby converting incident radiation over a range of frequencies into a radiation image having a range of intensities corresponding to said incident radiation frequencies so that the image intensity in said image plane varies as a unique function of the frequency of the incident radiation.

* * * * *